(12) United States Patent  
Gisin (10) Patent No.: US 8,561,864 B2
(45) Date of Patent: Oct. 22, 2013

(54) MAGNETIC VEHICLE RACK (76) Inventor: Yevgeniy M. Gisin, San Leandro, CA (US)

( * ) Notice: Subject to any disclaimer, the term of this patent is extended or adjusted under 35 U.S.C. 154(b) by 208 days.

(21) Appl. No.: 13/113,056

(22) Filed: May 22, 2011

(65) Prior Publication Data

US 2011/0297713 A1     Dec. 8, 2011

Related U.S. Application Data (63) Continuation-in-part of application No. 12/794,726, filed on Jun. 5, 2010, now abandoned.

(51) Int. Cl.
*B60R 9/04* (2006.01)

(52) U.S. Cl.
USPC ............................ 224/309; 224/324; 224/327

(58) Field of Classification Search
USPC ................ 224/309–310, 314–324, 327–329; D12/406, 412
See application file for complete search history.

(56) References Cited

U.S. PATENT DOCUMENTS

| | | | |
|---|---|---|---|
| 2,109,571 A | 3/1938 | Boeuf | |
| 3,583,613 A | 6/1971 | Gish | |
| 4,245,764 A * | 1/1981 | Kowalski et al. | 224/321 |
| 4,655,376 A | 4/1987 | Darling | |
| 4,747,529 A | 5/1988 | Hinderaker et al. | |
| 4,873,504 A * | 10/1989 | Blume et al. | 335/303 |
| 5,067,644 A | 11/1991 | Coleman | |
| 5,267,763 A * | 12/1993 | Klein | 293/128 |
| 5,312,030 A | 5/1994 | Baravalle | |
| 5,358,162 A | 10/1994 | Hill | |
| 5,377,888 A | 1/1995 | Baravalle | |
| 5,377,889 A | 1/1995 | Sumino et al. | |
| 5,460,310 A | 10/1995 | Corsarini | |
| 5,582,044 A | 12/1996 | Bolich | |
| 5,607,093 A | 3/1997 | Geier | |
| 5,641,105 A | 6/1997 | Goto | |
| 5,769,291 A | 6/1998 | Chasan | |
| 6,904,731 B2 * | 6/2005 | Wardle et al. | 52/746.11 |
| 2007/0181622 A1 | 8/2007 | Rocchil | |

* cited by examiner

*Primary Examiner* — Nathan J Newhouse
*Assistant Examiner* — Scott McNurlen (57) ABSTRACT

A magnetic vehicle rack having an elongated body constructed from a flexible polymeric material. The elongated body generally including an arciform cross-sectional profile, an oblate top surface, a planar bottom surface having one or more permanent magnet(s) disposed flush with the bottom surface and an axially aligned aperture dimensioned to axially receive an incurvate spine therethrough. Positioning of the incurvate spine within the elongated body uniformly distributes static and dynamic loads throughout the magnetic vehicle rack.

20 Claims, 7 Drawing Sheets

MAGNETIC VEHICLE RACK

CROSS-REFERENCE TO RELATED APPLICATIONS

This application is a continuation in part of co-pending U.S. patent application Ser. No. 12/794,726 filed Jun. 5, 2010 to the instant inventor. The instant application takes priority from co-pending patent application Ser. No. 12/794,726 and is hereby incorporated by reference as if fully set forth herein.

RELEVANT FIELD

This application is directed generally toward a vehicle rack and more specifically toward a magnetically coupled vehicle rack.

BACKGROUND

Numerous types of vehicle racks for carrying surfboards, skis, snowboards, kayaks and other elongated objects are known in the relevant art. Each of these vehicle racks has various advantages and disadvantages, including initial cost of the vehicle rack itself, the ease with which the vehicle rack can be mounted and removed from the vehicle, the relative ease with which the elongated object(s) can be secured in the vehicle rack, the number of elongated object(s) readily mounted therein, etc. In the past, a common type of vehicle rack included a pair of static vehicle rack assemblies adapted to be secured across the vehicle, typically in a paired spaced relationship upon a vehicle rooftop. Each assembly typically included a lower elongated member and an upper elongated member attached to the lower member so as to form an inverted U shaped structure. The raised cross-sectional profile adds to aerodynamic resistance and allows aerodynamic forces to be generated on the undersides of the elongated object(s) which requires additional structural integrity to ensure that the added aerodynamic forces do not overcome the restraints used to anchor the elongated object(s) to the vehicle rack assemblies.

In addition, metal frame based vehicle racks tend to be heavy, cumbersome to setup and disassemble, require multiple parts, are subject to corrosion, particularly when exposed to saltwater environments and lastly are bulky to store. Accordingly, there is a need in the relevant art for a lightweight and low cost vehicle rack that is simple to setup, remove and store and avoids one or more of the undesirable properties of vehicle racks known in the relevant art.

SUMMARY

In view of the foregoing, various exemplary embodiments of a magnetic vehicle rack are disclosed herein. The exemplary embodiments described provide a lightweight, easily installed and removed vehicle rack which is compact, offers reduced aerodynamic resistance and is adaptable to a wide variety of vehicles without specialized parts. In an exemplary embodiment, the magnetic vehicle rack may include an elongated body constructed from a deformable polymeric material. The elongated body may include an arciform or wedge shaped cross-sectional profile, an oblate top surface and a planar bottom surface. The elongated body may be provided with one or more axially aligned apertures dimensioned to receive an incurvate spine therethrough.

The aperture facilitates insertion and axial positioning of an incurvate spine in a slidable and snug fit relationship. The incurvate shape of the incurvate spine and dimensions of the aperture(s) within the elongated body further allows the incurvate spine to uniformly distribute static and dynamic forces arising from an elongated payload coupled with the oblate top surface throughout the elongated body. The elongated payload may be coupled with the magnetic vehicle rack using a plurality of restraints.

The magnetic vehicle rack may be removably coupled to the non-planar vehicle surface with one or more permanent magnet(s) disposed along the bottom surface of the elongated body, generally between proximal and distal ends of the elongated body. The one or more permanent magnet(s) cumulatively provides sufficient magnetic attractive force to allow the magnetic vehicle rack and elongated payload to remain coupled to the non-planar vehicle surface at vehicular speeds below a predetermined vehicle speed, typically 100 miles per hour exclusive of head or cross winds.

BRIEF DESCRIPTION OF DRAWINGS

The features and advantages of the various exemplary embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described exemplary embodiments without departing from the true scope and spirit of the inventive embodiments as is defined by the claims.

DETAILED DESCRIPTION

Various exemplary embodiments of a magnetic vehicle rack are disclosed herein. In the following detailed description, numerous specific details are set forth in order to provide a thorough understanding of the present inventive embodiments. It will be apparent, however, to one skilled in the art that the present inventive embodiments may be practiced without these specific details. In other instances, well-known structures, devices or components may be shown in block diagram form in order to avoid unnecessarily obscuring the present inventive embodiments.

Figure 1:
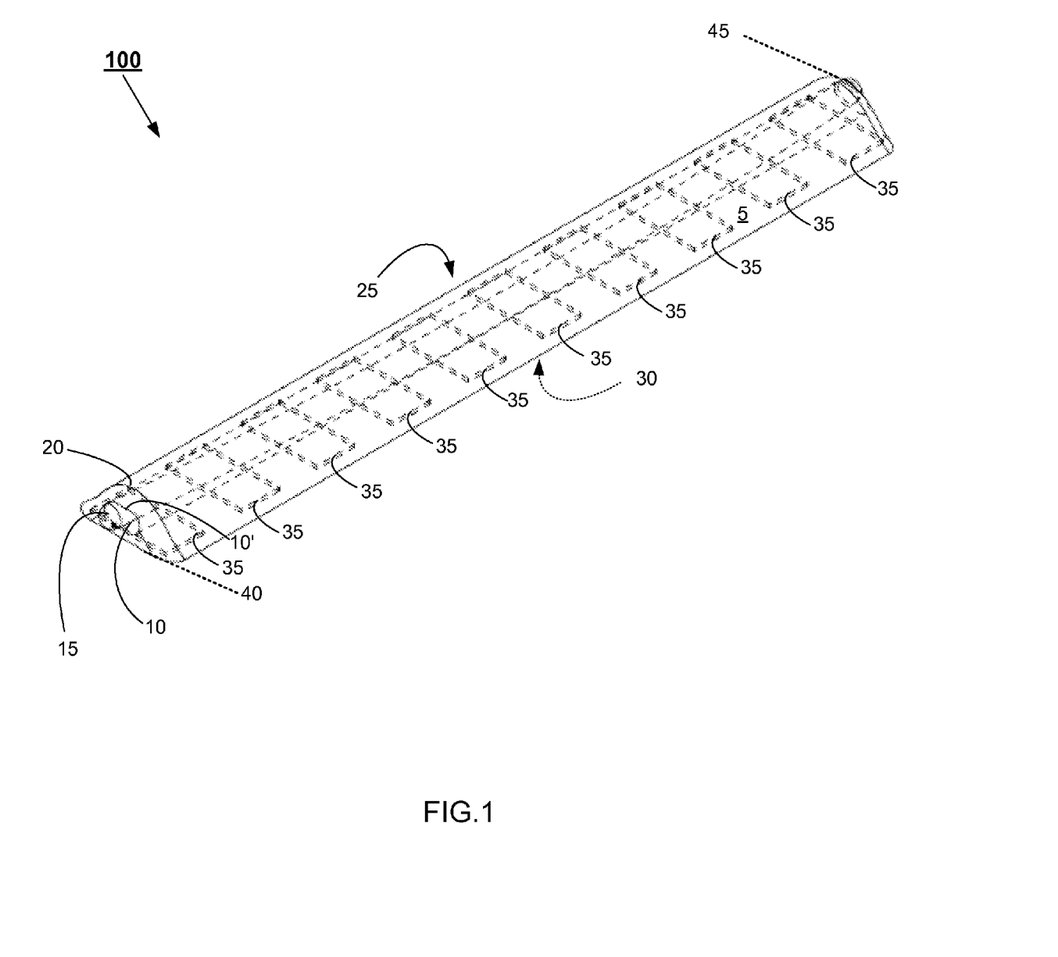
FIG. 1—depicts a first transparent isometric view of a magnetic vehicle rack in accordance with an exemplary embodiment.

Referring to FIG. 1, a transparent isometric view of a magnetic vehicle rack 100 in accordance with an exemplary embodiment is depicted. In this exemplary embodiment, the magnetic vehicle rack 100 includes an elongated body 5 dimensioned to substantially span a width of a common vehicle surface, for example, a hood, roof or trunk of an automobile. Typically, a length in a range of 30-36 inches should suffice. Other lengths, for example 15-32 inches may be provided to accommodate other elongated payloads such as snow boards, skis, boogie boards and the like. The elongated body 5 may be constructed of a deformable polymeric material. The polymeric material selected for construction of the magnetic vehicle rack 100 should provide sufficient rigidity and strength to support an elongated payload, (e.g., surfboard, lumber, panels and the like) and also be sufficiently flexible to allow temporary deformation to conform to an exterior ferromagnetic surface of a vehicle. Suitable polymers for construction of the elongated body 5 and related polymeric components include but are not limited to acrylonitrile butadiene styrene (ABS), polyvinyl chloride (PVC), neoprene, ethylene propylene-diene monomer (EPDM), nylon and/or other thermoplastics having sufficient plasticizer to allow the temporary deformation with a preferred hardness in a range of Shore D70-D90. Preferably, the polymers selected for forming the elongated body 5 and related components 330, 330' (FIG. 3A) include stabilization for ultraviolet light exposure. The elongated body 5 may be formed using common construction techniques including injection molding, extrusion and/or machining from a block, bar or rod.

The elongated body 5 includes an aperture 10 which axially spans a long dimension of the vehicle rack 100. The aperture 10 is dimensioned to receive an incurvate spine 15 which may extend beyond proximal and distal ends 40, 45 of the elongated body 5. The aperture 10 may be aligned to allow the incurvate spine 15 to be inserted with the curved profile generally in parallel with a base element 30 of the elongated body 5. The base element 30 preferably includes a width approximately 1.4-1.6 times greater than a width of an upper support element 25. The exact relationship of the width of the base element 30 and upper support element 25 may be varied to accommodate other design objectives. To reduce wind resistance across the longitudinal dimension of the elongated body 5, a wedge or arciform shape is preferred.

In an exemplary embodiment, an interior wall 10' surrounding the aperture 10 forms coincident engagement element(s) 330 (FIG. 3A) which allows static and dynamic loads to be uniformly distributed via the incurvate spine 15 among the one or more permanent magnets 35 when the incurvate spine 15 is axially positioned within the aperture 10. The aperture 10 provides a slidable and snug fit for receiving the incurvate spine therethrough. The elongated body 5 may include a generally arciform or wedge shape cross-sectional profile 20. An upper support element 25 of the elongated body 5 may be provided with an oblate top surface 60 (FIG. 2C) which allows an elongated payload to be supported thereupon. The arciform profile 20 minimizes aerodynamic resistance when a vehicle on which the magnetic vehicle rack 100 is mounted is in motion. In another exemplary embodiment, the elongated body 5 may be covered with a polymer foam coating 70 (FIG. 2C) to reduce wear and tear on the elongated payload 810 (FIG. 8) during transport. The polymer foam coating 70 preferably having firmness in a range of psi 9-15 (25% Deflection).

The elongated body 5 likewise minimizes aerodynamic lifting forces on an anchored payload 810 (FIG. 8) which may otherwise occur when a void space is present between a vehicle rack and the curved surface of a vehicle as is commonly found in vehicle racks known in the relevant art.

A base element 30 of the elongated body 5 includes one or more permanent magnet(s) 35 disposed therewith. The one or more permanent magnet(s) 35 may be periodically disposed along the base element 30 of the elongated body 5 in either a regular or staggered pattern. The one or more permanent magnet(s) 35 may be incorporated into the polymeric construction of the elongated body 5 at the time of formation or separately added thereafter. The cumulative magnetic attractive force generated by the one or more permanent magnet(s) 35 temporarily deforms the elongated body 5 into conformational alignment with the exterior surface of a vehicle. Conformational alignment occurs when the base element 30 of the magnetic vehicle rack 100 is in a direct face-to-face relationship with a symmetrically curved surface of the vehicle such that void spaces between the vehicle rack 100 and the curved surface of the vehicle are minimized.

The one or more permanent magnet(s) 35 should cumulatively provide a magnetic pull strength which preferably exceeds 120 pounds. The magnetic strength of the one or more permanent magnet(s) 35 may be staggered to provide greater attractive forces for the outer sets of permanent magnet(s) than those disposed approximately about the longitudinal center of the elongated body 5. The one or more permanent magnet(s) 35 cumulatively provide sufficient magnetic attractive force to maintain the magnetic vehicle rack 100 and payload 810 (FIG. 8) anchored thereto to be magnetically coupled to the non-planar vehicle surface at least for vehicular speeds up to 100 miles per hour, excluding cross or headwinds.

In one exemplary embodiment, the bottom surfaces of the one or more permanent magnet(s) 35 may include a non-abrasive surface to prevent marring of the non-planar vehicle surface (not shown). In another exemplary embodiment, the one or more permanent magnet(s) 35 may be formed from a unitary flexible sheet of magnet embedded polymeric material. For example, Plastalloy™ Flexible Magnets, available from The Electrodyne Company, Inc., 4188 Taylor Road, Batavia, Ohio 45103. The magnet embedded polymer should provide a magnetic attraction force in a range of 0.5 to 2.0 pounds per square inch. The base element 30 incorporating the embedded magnetic material may be flared in a somewhat biconical arrangement at about the proximal 510 and distal ends 510, 530 (FIG. 5) to provide greater magnetic attractive forces at the proximal and distal ends of the magnetic vehicle rack 100. In one exemplary embodiment, a length of the base element 30 is greater than a length of the elongated body 5.

In one exemplary embodiment, the one or more permanent magnet(s) 35 may be constructed from a rare earth, for example, neodymium or samarium based alloys. In this exemplary embodiment, the shape of the one or more permanent magnet(s) 35 is generally elongated with at least one planar surface which allows maximum attractive force to be applied to a ferromagnetic surface of a vehicle. In all embodiments, the one or more permanent magnet(s) 35 include sufficient magnetic attractive forces to deform the elongated body 5 to match a surface contour of a vehicle. Uniform load distribution through the elongated body 5 is accomplished by insertion and axial positioning of the incurvate spine 15 as is discussed below. In another exemplary embodiment, insertion of the incurvate spine 15 may be used to align the one or more permanent magnet(s) 35 into a proper orientation for mounting or dismounting of the magnetic vehicle rack 100 onto or from a vehicle.

Referring to FIGS. 2A-2D, various side views and an end view of a magnetic vehicle rack 100 in accordance with an exemplary embodiment are depicted. In one exemplary embodiment, the incurvate spine 15 is shown extending beyond the proximal and distal ends 40, 45 of the elongated body 5. The incurvate spine 15 is oriented such that the curved profile 215 (FIG. 2D) is axially positioned within the aperture 10 and in contact with a wall 10' as depicted in the end view of a magnetic vehicle rack 100 of FIG. 2C. In practice, the amount of deformation of the elongated body 5 is determined by the shape of the vehicle surface in which the magnetic vehicle rack 100 is mounted.

Figure 2A:
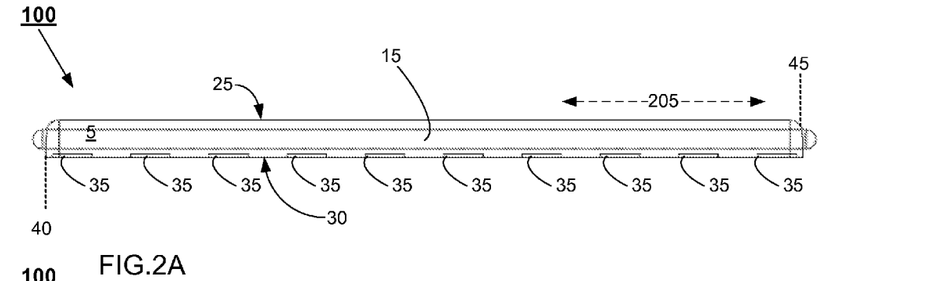
FIG. 2A—depicts a first transparent side view of a magnetic vehicle rack in accordance with an exemplary embodiment.
Figure 2B:
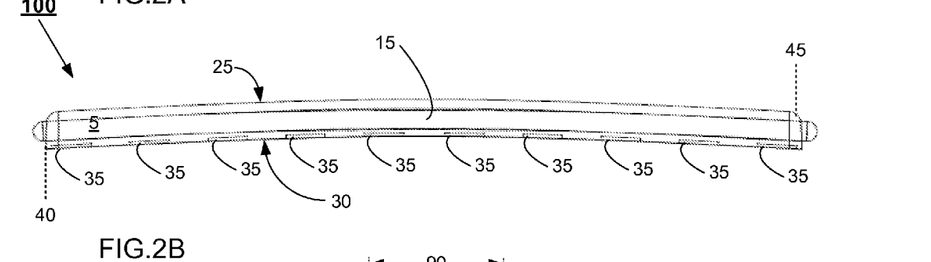
FIG. 2B—depicts a second transparent side view of a magnetic vehicle rack in accordance with an exemplary embodiment.
Figure 2C:
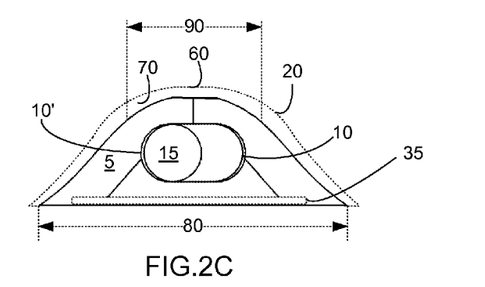
FIG. 2C—depicts a first end view of a magnetic vehicle rack in accordance with an exemplary embodiment.

Axial positioning 205 of the incurvate spine 15 is intended to align the incurvate spine 15 in conformation with the surface contour of the vehicle on which the magnetic vehicle rack 100 is mounted. The incurvate spine 15 when properly positioned within the aperture 10 distributes lifting forces incident on a payload anchored to the magnetic vehicle rack 100 equally throughout the elongated body 5 and the one or more permanent magnet(s) 35. The incurvate spine 15 should have sufficient strength to transmit restraining forces to each of the one or more permanent magnet(s) 35 without substantial self deformation while remaining generally congruent with a surface contour of the vehicle on which the magnetic vehicle rack 100 is mounted.

Figure 2D:
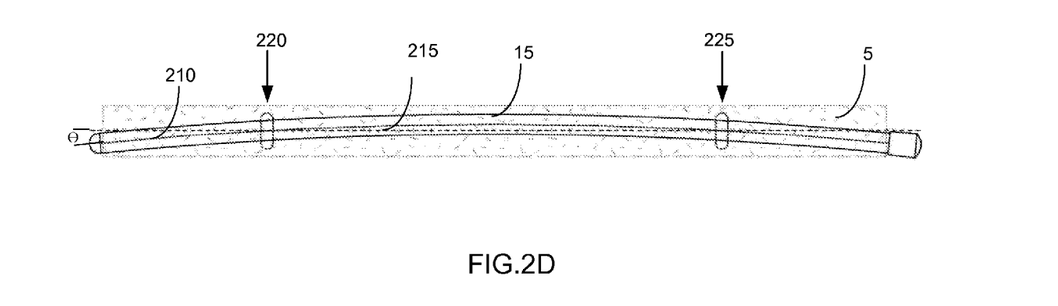
FIG. 2D—depicts a side view of an incurvate spine in accordance with an exemplary embodiment.

Referring to FIG. 2D, a side view of the incurvate spine 15 in accordance with an exemplary embodiment is depicted. In this exemplary embodiment, the incurvate spine 15 includes an incurvate shape. In an exemplary embodiment, the ends of the incurvate spine 15 are symmetrically deflected in a range θ of about 1.0-5.0 degrees from linear when measured from the center of the incurvate spine 15 to an end of the incurvate spine 15. The amount of curvature of the incurvate spine 15 allows the vehicle rack 100 to conform with a wide range of symmetrically 5 curved vehicle surfaces. The incurvate spine 15 may be constructed from any suitable rigid material, preferably a non-ferromagnetic rod-like material and should have a length in a range of 5-15% greater than the length of the elongated body 5. The incurvate spine 15 may be either a solid cylindrical rod or hollow tube having sufficient strength to transmit static and dynamic forces throughout the magnetic vehicle rack 100 via contact with at least the 10' wall surrounding the aperture without substantial bending or flexing.

Suitable construction materials for the incurvate spine 15 include but are not limited to fiberglass, aluminum alloys, carbon fiber and austenitic stainless steel. In one exemplary embodiment, contralateral attachment positions 220, 225 for coupling of restraints 305 (FIG. 3A) are provided at locations where a longitudinal centerline axis 210 (dotted line) of the incurvate spine 15 converges with a longitudinal centroidal axis (dashed line) 215 of the incurvate spine 15. Coupling of restraints at these locations 220, 225 ensures that static and dynamic forces arising from a payload anchored to the magnetic vehicle rack 100 are uniformly distributed through the elongated body 5 (FIG. 2A) and among the one or more permanent magnet(s) 35 without generating an axial rotation-causing moment which would act to move the incurvate spine out of alignment with the elongated body 5 and potentially dislodge the magnetic vehicle rack 100 from the vehicle.

While being inserted into conformational alignment and/or congruence with a vehicle's surface contour, the incurvate spine 15 is rotated into a downward facing arc relative to a contact surface of the vehicle by the magnetic attractive force generated by the one or more permanent magnets 35. The arced position prevents axial rotation by the incurvate spine 15 and may assist in maintaining the magnetic base element in conformational alignment with the vehicle's surface. In an exemplary embodiment, a locking mechanism may be used to lock the incurvate spine 15 within the elongated body 5 (not shown). By way of example and not limitation, a locking mechanism may include a star-patterned plug on a portion of the incurvate spine 15 with a counterpart star-patterned socket included in a portion of the elongated body 5, insertion of a locking pin which traverses portions of both the elongated body 5 and incurvate spine 15 and/or a clamping mechanism which is engaged by the user when the incurvate spine 15 is properly aligned within the aperture(s) 10. A lock tab extending from a side of the incurvate spine 15 may also be provided to prevent unauthorized removal of the magnetic vehicle rack 100 from the vehicle (not shown.) Alternately, a C-clip or Cotter pin may be provided at about the distal end of the incurvate spine 15 (not shown) in order to prevent the incurvate spine 15 from becoming dislodged from the aperture 10.

In one exemplary embodiment, the contralateral attachment positions 220, 225 are symmetrically at about 21% and about 79% of the length of the incurvate spine 15 (FIG. 2D). One skilled in the art will appreciate that alternate mechanisms to uniformly distribute forces among the elongated body 5 (FIG. 2A) and the one or more permanent magnet(s) 35 (FIG. 2A) may be employed as well. In another exemplary embodiment, the contralateral attachment positions 220, 225 are disposed through the upper support element 25 of the elongated body 5 (FIGS. 7A, 7B.)

Figure 3A:
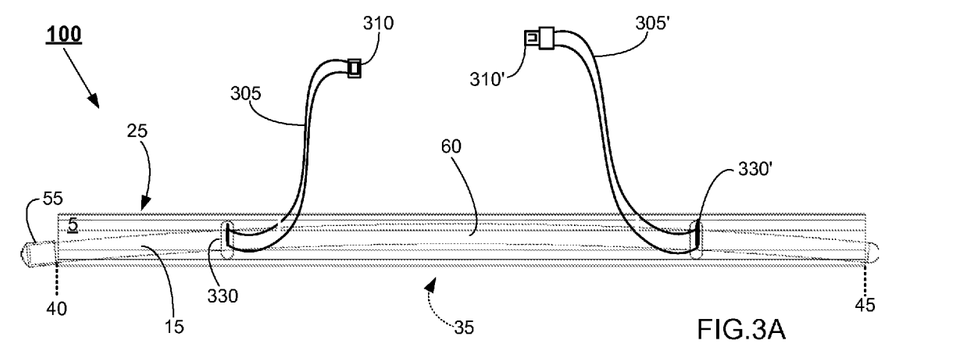
FIG. 3A—depicts a top transparent view of a magnetic vehicle rack in accordance with an exemplary embodiment.

Referring to FIG. 3A, a top view of the magnetic vehicle rack 100 in accordance with an exemplary embodiment is depicted. In this exemplary embodiment, the elongated body 5 of the magnetic vehicle rack 100 is provided with restraints 305, 305' to anchor a payload 810 (FIG. 8) in contact with the rack's upper support element 25. The restraints 305, 305' may be of any convenient type including straps, elastic bands, cables, and/or rope. The restraints 305, 305' may include a locking means 310, 310' including but not limited to buckles and/or hooks, hook/loop fasteners, mechanical fasteners or may simply be hand tied in a knot (not shown) to anchor the payload with the vehicle rack 100. The proximal end of the incurvate spine 15 should extend a sufficient amount beyond the proximate end 40 of the elongated body 5 to allow for grasping and/or manipulation by a user. In an exemplary embodiment a grasping cap 55 is provided over the incurvate spine 15 to allow for greater control when manipulating the incurvate spine 15.

The restraints 305, 305' may be coupled with posts 330, 330' disposed at the contralateral attachment positions 220, 225 (FIG. 2B) and/or other contralateral positions along a longitudinal axis of the elongated body 5 or incurvate spine 15. The posts 330, 330' are directly coupled with the incurvate spine 15 and not the upper support element 25 for proper static and dynamic load distribution throughout the elongated body 5 and one or more permanent magnets 35.

Figure 3B:
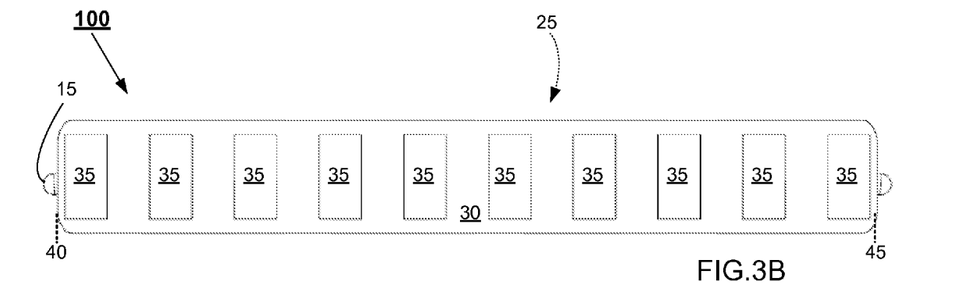
FIG. 3B—depicts a first bottom view of a magnetic vehicle rack in accordance with an exemplary embodiment.
Figure 3C:
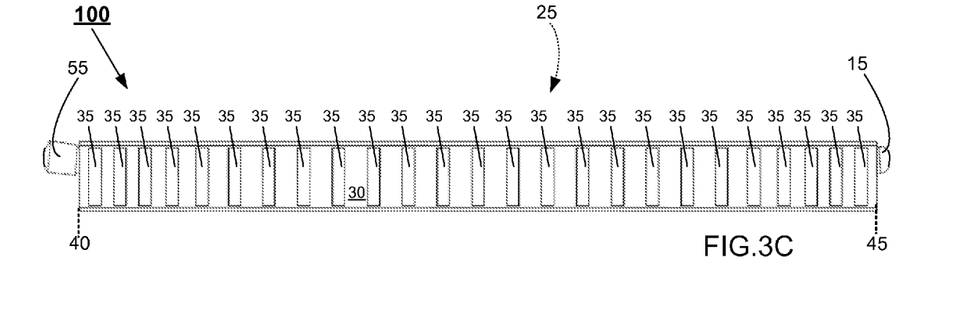
FIG. 3C—depicts a second bottom view of a magnetic vehicle rack in accordance with an exemplary embodiment.

Referring to FIG. 3B-3C, first and second bottom views of a magnetic vehicle rack 100 in accordance with an exemplary embodiment is depicted. In this exemplary embodiment, the base element 30 of the elongated body 5 is shown having a generally planar surface. The one or more permanent magnet(s) 35 are shown periodically distributed or staggered as illustrated in FIG. 3C across the base element 30 to provide greater magnetic attractive forces at the proximal and distal 40, 45 ends of the elongated body 5. One skilled in the art will appreciate that the one or more permanent magnet(s) 35 may be distributed so as to maximize attractive forces with a vehicle surface at locations receiving the greatest lifting forces during vehicular motion.

In one exemplary embodiment, the one or more permanent magnet(s) 35 are mounted flush with the base element 30 of the elongated body 5 so as to ensure minimal aerodynamic forces are exerted on the magnetic vehicle rack 100 and/or elongated payload 810 (FIG. 8) anchored thereto. As previously discussed, the one or more permanent magnet(s) 35 may be bound to the elongated body 5 during formation of the elongated body 5 or bonded afterward thereto using epoxy or other types of adhesives. In one exemplary embodiment, the one or more permanent magnet(s) 35 are oriented so as to minimize attractive (opposite) polarities.

Figure 4:
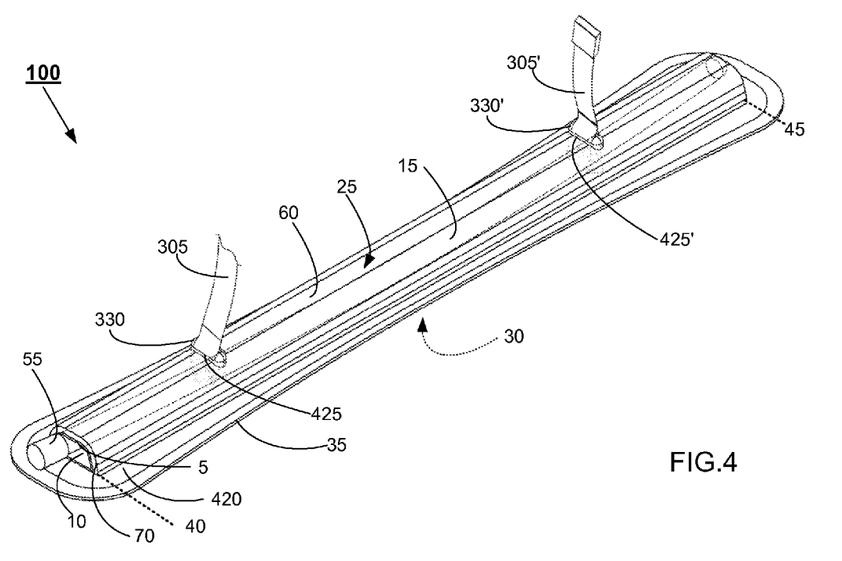
FIG. 4—depicts a second transparent isometric view of a magnetic vehicle rack in accordance with an exemplary embodiment.
Figure 5:
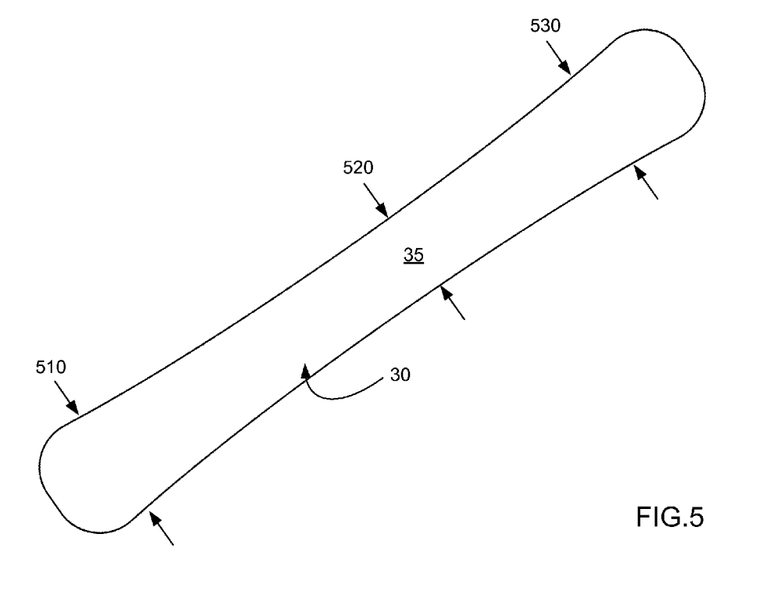
FIG. 5—depicts a third bottom view of a magnetic vehicle rack in accordance with an exemplary embodiment.

Referring to FIGS. 4-5, an isometric and a bottom view of a magnetic vehicle rack 100 in accordance with an exemplary embodiment is depicted. In this exemplary embodiment, the elongated body 5 is formed from a generally C-shaped polymer. An exterior surface of the elongated body 5 may include a polymeric foam covering 70 for cushioning of an elongated payload 810 (FIG. 8) during transport. In an exemplary embodiment, the polymeric foam covering 70 is provided at least upon an oblate top surface 60 of the elongated body 5. In this exemplary embodiment, the oblate top surface 60 forms an upper support element 25. A pair of posts 330, 330' extend generally perpendicularly through slots 425, 425' provided in the upper support element 25 and foam 70 covering. The posts 330, 330' provide symmetric contralateral attachment points 220, 225 (FIG. 2D) for the restraints 305 (FIG. 3A).

The posts 330, 330' also perform the function of coincident engagement element(s) 330, 330' (FIG. 3A) which positions the incurvate spine 15 into a geometry which maintains the elongated body 5 in conformational alignment with a vehicle surface as discussed with respect to FIG. 6A below. The elongated body 5 is coupled at its base with a thin mild steel plate 420 dimensioned to surround a footprint formed by the elongated body 5. The steel plate 420 may be coupled to the elongated body 5 by bonding with an adhesive or a tab and slot arrangement as is shown and discussed with respect to FIG. 6B below.

A unitary flexible sheet of polymeric material embedded with permanent magnetic material coupled to an underside face of the mild steel plate 420 forms a magnetic base element 30 which is used to magnetically couple the magnetic vehicle rack 100 to an exterior surface of a vehicle. The one or more permanent magnets 35 are incorporated within the magnetic base element 30. The mild steel plate 420 is intended to improve magnetic permeability and coupling with the ferromagnetic surface of the vehicle. The proximal 510 and distal ends 530 of the magnetic base element 30 may be provided in a general biconical 510, 520, 530 relationships which provide greater magnetic surface area at the proximal 40 and distal ends 45 of the elongated body 5. The increased magnetic surface area provided by the biconical shape improves magnetic coupling of the magnetic vehicle rack 100 to the exterior surface of the vehicle. One skilled in the art will appreciate that other shapes and/or increasing the length of the magnetic base element 30 may be implemented to increase the magnetic attractive force as required to meet a particular design objective.

Figure 6A:
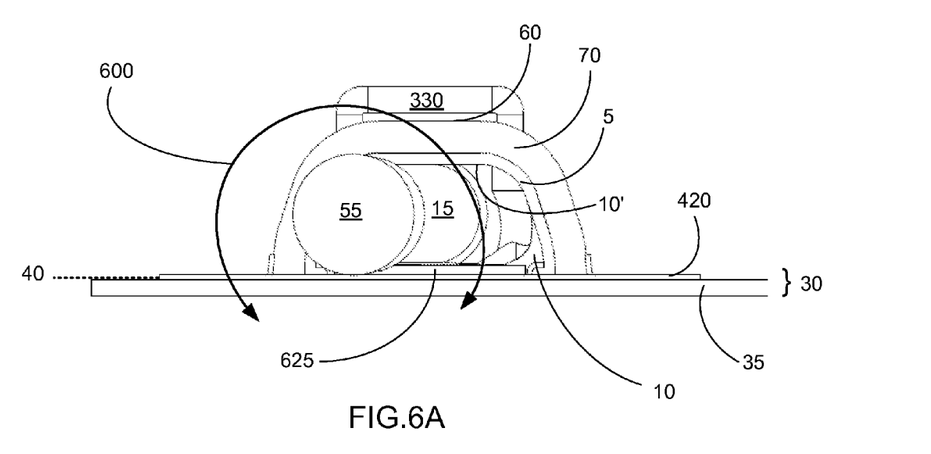
FIG. 6A—depicts a second end view of a magnetic vehicle rack in accordance with an exemplary embodiment.

Referring to FIG. 6A, a proximal end view of the magnetic vehicle rack 100 in accordance with an exemplary embodiment is depicted. In this exemplary embodiment, the proximal end of the magnetic vehicle rack 100 is shown with the grip cap 55 installed on an end of the incurvate spine 15. The incurvate spine is rotationally 600 positioned within the aperture 10 of the elongated body 5 and utilizes an aperture 710 (FIG. 7) provided in the post 330 as a routing guide during insertion or removal. During manipulation of the incurvate spine 15, a user may push, pull and/or axially rotate the incurvate spine 15 with the grip cap 55. The incurvate spine 15 includes a diameter sufficient to provide a slidable yet snug fit within the aperture 10. A wall 10' surrounding the aperture 10 provides an axial contact surface with the incurvate spine 15 to allow for uniform static and dynamic load transfers throughout the elongated body 5 and magnetic base element 30. A polymeric spacer 625 may be provided to radially position the incurvate spine 15 to allow a sufficient amount of clearance for user to manipulate the grasping cap 55.

Figure 6B:
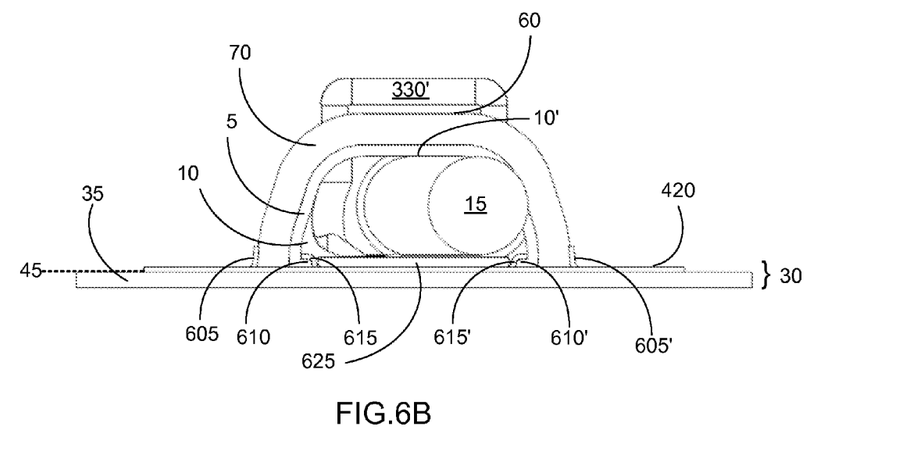
FIG. 6B—depicts a third end view of a magnetic vehicle rack in accordance with an exemplary embodiment.

Referring to FIG. 6B, a distal end view of the magnetic vehicle rack 100 in accordance with an exemplary embodiment is depicted. In this exemplary embodiment, the distal end of the magnetic vehicle rack 100 is positioned within the aperture of the elongated body 5 and likewise utilizes an aperture 710 (FIG. 7) provided in a second post 330' as a routing guide during insertion or removal. The curvature of the incurvate spine 15 is generally symmetrical which disposes the ends of the incurvate spine 15 at complementary positions at opposite ends of the elongated body 5.

As mentioned above, the elongated body 5 may be coupled to the mild steel plate 420 using a slot and tab arrangement. The elongated body 5 includes opposing lateral base tabs 610, 610' which are affirmatively engaged with opposing interior slots 615, 615' formed into the mild steel plate 420. Perpendicular stops 605, 605' are also formed into the mild steel plate 420 which prevents the opposing lateral base tabs 610, 610' from being displaced from the opposing interior slots 615, 615'. In effect, the opposing interior slots 615, 615' and perpendicular stops 605, 605' form parallel channels in which the opposing lateral base tabs 610, 610' of the elongated body 5 are affirmatively coupled to the magnetic base element 30. To ensure that the elongated body 5 remains affirmatively coupled to the magnetic base element 30, an adhesive should be used to bond the opposing lateral base tabs 610, 610' to a top face of the mild steel plate 420 and directly with permanent magnet(s) 35 coupled to the underside face of the mild steel plate 420.

Figure 7:
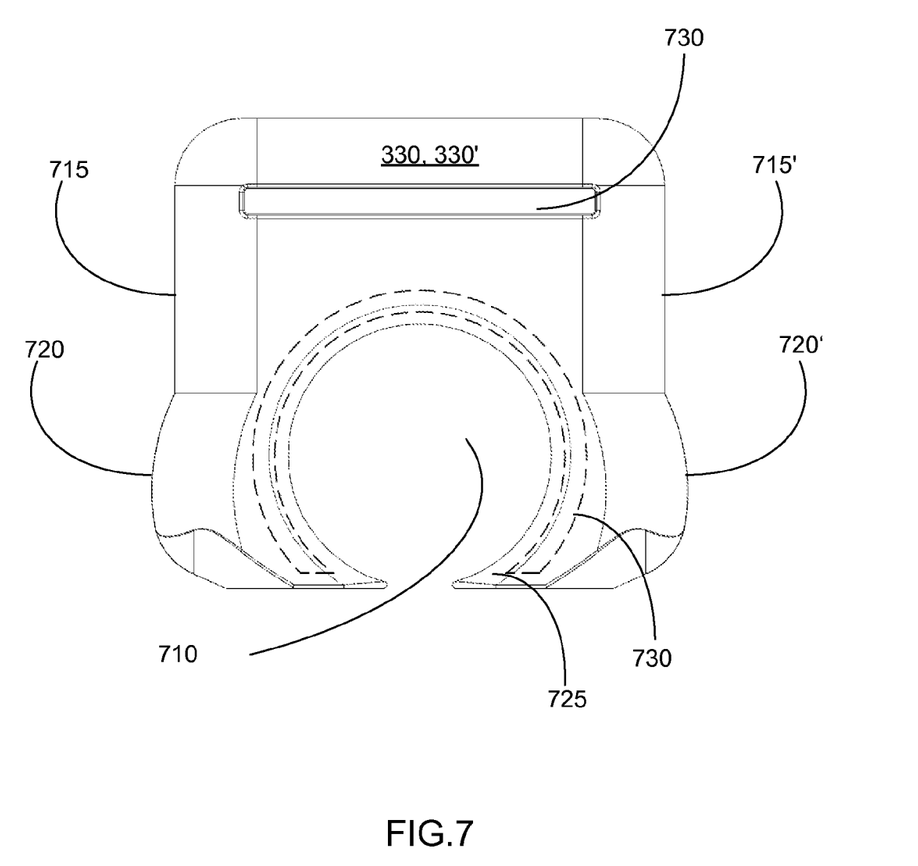
FIG. 7—depicts a front view of a post in accordance with an exemplary embodiment.

Referring to FIG. 7, a frontal view of a post 330, 330' in accordance with an exemplary embodiment is depicted. In this exemplary embodiment, the post 330, 330' is formed from any of the previously discussed suitable polymeric materials. The post 330, 330' includes a generally quadrilateral frontal profile with contralateral bulbous sections 720, 720' formed into the lower side portions of the posts 330, 330'. The contralateral bulbous side sections 720, 720' are dimensioned to provide interference fits through the slots 425, 425' (FIG. 4) formed into the upper support element 25. Once inserted through the slots 425, 425' (FIG. 4), the posts 330, 330' remain within the aperture 10 of the elongated body 5 with the main aperture 710 axially aligned to receive the incurvate spine 15 therethrough. Contralateral upper side portions 715, 715' are generally aligned in parallel.

A width of the contralateral upper side portions 715, 715' is slightly less than long dimensions of the slots 425, 425' (FIG. 4), allowing for minimal movement of the posts 330, 330' once the incurvate spine 15 is inserted through the main aperture 710. The posts 330, 330' include a second aperture 740 dimensioned to receive a restraint 305, 305' (FIG. 4) therethrough for example, a strap. The main aperture 710 includes a general omegoid shape and is dimensioned to receive the incurvate spine 15 therethrough in a sliding and snug fit rotational relationship. A wall 725 surrounding the main aperture 710 may be reinforced with a partial metal ring 730 which prevents opening at the base of the omegoid shape under load. The metal reinforcement ring 730 may be constructed from chromoly steel or another high tensile strength metal. The overall dimension of the posts 330, 330' are not critical. However, care should be exercised to minimize the extent in which the post 330, 330' may interfere with anchoring the elongated payload 810 (FIG. 8) directly to the upper support element 25.

Figure 8:
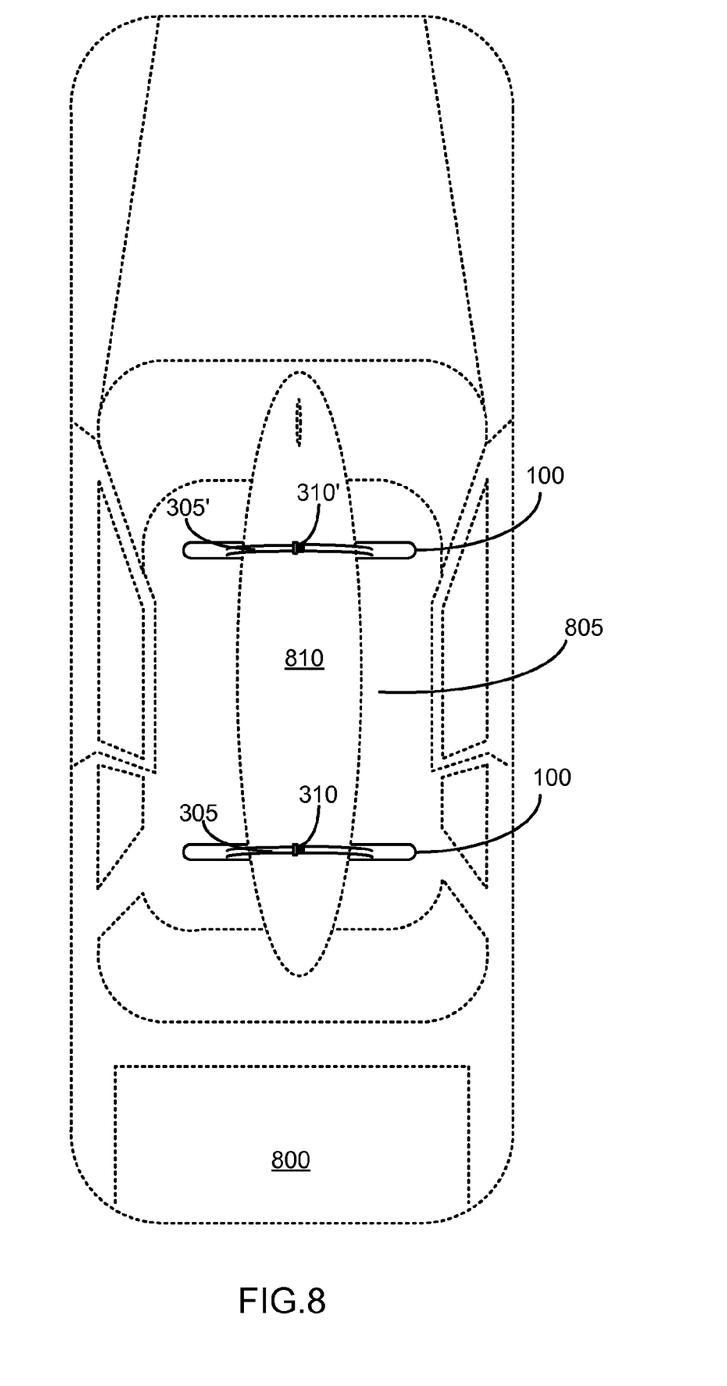
FIG. 8—depicts a top view of a magnetic vehicle rack mounted on a vehicle in accordance with an exemplary embodiment.

Referring to FIG. 8, a top view of the magnetic vehicle rack 100 installed on a vehicle 800 in accordance with an exemplary embodiment is depicted. In this exemplary embodiment, a pair of magnetic vehicle racks 100 is shown laterally coupled to a roof 805 of the vehicle 800. An elongated payload 810 (e.g., surfboard) is anchored to the magnetic vehicle racks 100 with restraints 305, 305'. In this exemplary embodiment, the restraints 305, 305' are retained against the elongated payload 810 with buckles 310, 310'. Each magnetic vehicle rack 100 is magnetically mounted to the roof 805 of the vehicle 800 as described below.

A magnetic vehicle rack 100 is typically placed on a non-planar vehicle surface (e.g., roof) 805 and laterally aligned with respect to a long dimension of the vehicle 800. The one or more permanent magnet(s) 35 are attracted to the ferromagnetic construction of the vehicle's roof 805 causing the magnetic vehicle rack 100 to conform to the contour of the vehicle's roof 805. The user may adjust the position of the magnetic vehicle rack 100 by sequentially lifting a section(s) of the magnetic vehicle rack 100 and repositioning as is necessary to allow the magnetic vehicle rack 100 to conform to the contour of the vehicle's roof 805.

Once the magnetic vehicle rack 100 is properly positioned, the incurvate spine 15 (FIG. 1) is inserted into the aperture(s) 10 (FIG. 1) typically with the curved profile remaining generally in parallel to the vehicle's roof 805. Once the incurvate spine is fully inserted into the aperture(s) 10 (FIG. 1), the incurvate spine remains axially positioned in conformational alignment with the curved surface of the vehicle's roof 805. In this exemplary embodiment, the curved surface of the vehicle 800 is the vehicle's roof 805. This procedure may then be repeated for a second magnetic vehicle rack 100 which is placed in a spaced parallel relationship with the first mounted magnetic vehicle rack 100 on the vehicle's roof 805.

The elongated payload (surfboard 810) is then placed upon the magnetic vehicle racks 100 and anchored thereto with the restraints 305, 305' and attachment means 310, 310'. The procedure is easily reversed to remove the magnetic vehicle racks 100 from the vehicle's roof 805. It is important to note that the magnetic vehicle racks 100 cannot be easily removed from the vehicle's roof 805 until the incurvate spine(s) 15 are removed from the elongated body(s) 5 of the vehicle racks 100. Once the incurvate spine(s) 15 are removed, the deformable polymeric material from which the magnetic vehicle racks 100 are constructed provides sufficient flexibility to sequentially remove each section containing a permanent magnet 35 from the vehicle's roof 805. In embodiments where a unitary permanent magnet is employed, the elongated body 5 may be successively pulled away from the surface of the vehicle 800 until removal is completed.

The various exemplary inventive embodiments described herein are intended to be merely illustrative of the principles underlying the inventive concept. It is therefore contemplated that various modifications of the disclosed embodiments will without departing from the inventive spirit and scope be apparent to persons of ordinary skill in the art. They are not intended to limit the various exemplary inventive embodiments to any precise form described. In particular, it is contemplated that the magnetic vehicle rack may be constructed from any suitable material with different dimensions and/or cross-sectional profiles. No specific limitation is intended to a particular construction material(s), assembly order, shape or sequence described. Other variations and inventive embodiments are possible in light of the above teachings, and it is not intended that the inventive scope be limited by this specification, but rather by the Claims following herein.

What is claimed is:

1. A vehicle rack comprising:
    an elongated body formed primarily from a flexible polymeric material including, a length of the elongated body dimensioned to laterally span a substantial portion of an exterior surface of a vehicle, a magnetic base element, a proximal end and a distal end;
    the magnetic base element having a generally planar bottom surface, the magnetic base element including one or more permanent magnets coupled in planar alignment with the bottom surface thereof, the one or more permanent magnets having sufficient magnetic attractive force to maintain the vehicle rack and an elongated payload anchored thereto magnetically coupled to the non-planar vehicle surface under both static and dynamic load conditions;
    an upper support element aligned generally in parallel with the magnetic base element and dimensioned to receive the elongated payload thereupon intermediate the proximal and distal ends; and
    an aperture spanning a long dimension of the elongated body intermediate the upper support element and the magnetic base element, the aperture dimensioned to receive therethrough an incurvate spine in an axial rotational relationship within the elongated body such that a curvature of the incurvate spine is in conformational alignment with the exterior surface of the vehicle;
    the incurvate spine formed from a rigid material and longitudinally dimensioned to extend through the aperture beyond the length of the elongated body.

2. The vehicle rack of claim 1 wherein the incurvate spine is configured to uniformly transfer static and dynamic loads throughout the elongated body and magnetic base element at least by direct axial contact with a wall of the aperture.

3. The vehicle rack of claim 1 further comprising a plurality of posts aligned in a plane generally perpendicular to a long axis of the elongated body and directly coupled with the incurvate spine.

4. The vehicle rack of claim 1 wherein the elongated body further includes an arciform cross-sectional profile with the greatest width forming the magnetic base element.

5. The vehicle rack of claim 3 wherein the posts are disposed at symmetric contralateral positions in which an axial centerline of the incurvate spine converges with a centroidal axis of the incurvate spine.

6. The vehicle rack of claim 1 wherein the elongated payload is a surfboard.

7. A vehicle rack comprising:
    an elongated body constructed from a deformable polymeric material, the elongated body having a generally arciform cross-sectional profile, an oblate top surface and a planar bottom surface;
    an aperture dimensioned to axially receive a rigid, incurvate spine in a slidable and snug fit relationship;
    the incurvate spine configured to conform with a non-planar surface of a vehicle by coincident engagement with an internal structure maintained with the elongated body;

one or more permanent magnets disposed along the bottom surface of the elongated body having sufficient magnetic attractive force to conform the elongated body to the non-planar surface of the vehicle;

a plurality of restraints adapted to anchor an elongated payload to the vehicle rack at symmetric contralateral positions in which an axial centerline of the incurvate spine converges with a centroidal axis of the incurvate spine.

8. The vehicle rack of claim 7 wherein the incurvate spine is a non-ferromagnetic rigid rod or a tube.

9. The vehicle rack of claim 7 wherein a long dimension of the incurvate spine is dimensioned to coincidentally align within the aperture with the bottom surface of the elongated body in a face-to-face relationship with a symmetrically curved vehicle surface.

10. The vehicle rack of claim 7 wherein a width of the planar bottom surface is approximately 1.3-2.0 times wider than a width of the oblate top surface.

11. A vehicle rack comprising:

a flexible elongated body having a proximal end, a distal end, an upper support element, an aperture which axially spans a long dimension of the elongated body, and a magnetic base element adapted to conform the elongated body to an exterior surface of a vehicle by magnetic attraction;

a rigid, incurvate spine dimensioned to span through a length of the aperture in a snug fit relationship with a wall of the aperture, such that when the incurvate spine is inserted through the aperture, forces generated by an elongated payload are uniformly distributed along the magnetic base element without causing axial rotation of the incurvate spine;

a plurality of posts for anchoring the elongated payload to the upper support element of the vehicle rack with one or more restraints coupled thereto.

12. The vehicle rack of claim 11 wherein each of the plurality of posts is aligned in a plane generally perpendicular to a long dimension of the upper support element.

13. The vehicle rack of claim 11 wherein each of the plurality of posts includes an aperture dimensioned to axially receive the incurvate spine therethrough, each aperture dimensioned to allow insertion of the incurvate spine therethrough.

14. The vehicle rack of claim 11 wherein the posts are disposed at symmetric contralateral positions in which an axial centerline of the incurvate spine converges with a centroidal axis of the incurvate spine.

15. The vehicle rack of claim 11 wherein the incurvate spine axially protrudes a predetermined length from the proximal end of the elongated body sufficient for grasping by a user.

16. The vehicle rack of claim 11 wherein at least the upper support element includes an exterior polymeric foam coating in contact therewith.

17. The vehicle rack of claim 11 wherein the magnetic base element is formed with a unitary sheet of flexible permanent magnet material.

18. The vehicle rack of claim 11 wherein the magnetic base element is formed with a plurality of permanent magnets embedded in a flexible polymeric material.

19. The vehicle rack of claim 11 wherein the flexible elongated body includes a generally arciform cross sectional profile with an oblate top surface forming the upper support element and a planar bottom surface forming the magnetic base element.

20. The vehicle rack of claim 19 further comprising a locking mechanism for preventing displacement of the incurvate spine from the aperture of the elongated body.

* * * * *